(12) United States Patent
Mouri et al.

(10) Patent No.: US 11,768,141 B2
(45) Date of Patent: Sep. 26, 2023

(54) OBJECT HARDNESS MEASURING DEVICE AND METHOD

(71) Applicants: National University Corporation Tokai National Higher Education and Research System, Aichi (JP); MIZUNO CORPORATION, Osaka (JP)

(72) Inventors: Tetuya Mouri, Gifu (JP); Tomoe Ozeki, Gifu (JP); Yuki Yamada, Osaka (JP); Kazuhiro Kume, Osaka (JP); Akihiro Kanda, Osaka (JP); Kazuyuki Takita, Gifu (JP)

(73) Assignees: National University Corporation Tokai National Higher Education and Research System, Aichi (JP); MIZUNO CORPORATION, Osaka (JP)

( * ) Notice: Subject to any disclaimer, the term of this patent is extended or adjusted under 35 U.S.C. 154(b) by 0 days.

(21) Appl. No.: 17/572,972

(22) Filed: Jan. 11, 2022

(65) Prior Publication Data
US 2022/0221386 A1     Jul. 14, 2022

(30) Foreign Application Priority Data

Jan. 14, 2021 (JP) .................................. 2021-004055
Jan. 7, 2022 (JP) ................................. 2022-0013 81

(51) Int. Cl.
*G01N 3/48* (2006.01)
*A63B 71/14* (2006.01)
*A63B 102/18* (2015.01)

(52) U.S. Cl.
CPC .............. *G01N 3/48* (2013.01); *A63B 71/143* (2013.01); *A63B 2102/18* (2015.10); *G01N 2203/0078* (2013.01); *G01N 2203/04* (2013.01)

(58) Field of Classification Search
CPC ............. G01N 3/48; G01N 2203/0078; G01N 2203/04; G01N 3/40; A63B 71/143;
(Continued)

(56) References Cited

U.S. PATENT DOCUMENTS 6,196,073 B1    3/2001   Harding
6,526,813 B1    3/2003   Casler
(Continued)

FOREIGN PATENT DOCUMENTS

CN        108844838 A     11/2018
JP         H10-267816 A    10/1998
(Continued)

OTHER PUBLICATIONS

Decision to Grant a Patent dated May 24, 2023 issued in Japanese Patent Application No. 2022-001381.

*Primary Examiner* — Robert R Raevis
(74) *Attorney, Agent, or Firm* — Troutman Pepper Hamilton Sanders LLP; James E. Schutz; Korbin Blunck

(57) ABSTRACT

An object hardness measuring device includes a first side portion, a second side portion, a pedestal unit, a load unit, a measuring unit, and a holding unit. The load unit applies a load to the measurement object. The measuring unit is able to measure, in a state where the load acts on the measurement object, at least one of a movement distance of the second side portion with respect to the first side portion and a change amount of the load when the second side portion is moved either at a predetermined speed or to a predetermined position. The holding unit is able to hold the mea- (Continued)

surement object, and is movable between the first side portion and the second side portion by the slide rail unit.

8 Claims, 13 Drawing Sheets

(58) Field of Classification Search
CPC . A63B 2102/18; A63B 60/42; A63B 2220/20; A63B 2220/51
USPC .................................................. 73/78, 81–84
See application file for complete search history.

(56) References Cited

U.S. PATENT DOCUMENTS

2013/0255362 A1\* 10/2013 Takemura ................ G01N 3/42
73/81
2016/0061700 A1 3/2016 Patel et al.

FOREIGN PATENT DOCUMENTS

| JP | 2007-047119 A | 2/2007 |
|----|---------------|--------|
| JP | 2013-205020 A | 10/2013 |
| JP | 2020120978 A \* | 8/2020 |

\* cited by examiner

OBJECT HARDNESS MEASURING DEVICE AND METHOD

This non-provisional application is based on Japanese Patent Application No. 2021-004055 filed on Jan. 14, 2021, and Japanese Patent Application No. 2022-001381 filed on Jan. 7, 2022, with the Japan Patent Office, the entire contents of which are hereby incorporated by reference.

BACKGROUND OF THE INVENTION

Field of the Invention

The present invention relates to an object hardness measuring device and an object hardness measuring method.

Description of the Background Art

Conventionally, the hardness of a catching tool for baseball or softball as an example of a measurement object is evaluated by feeling when a user wears the catching tool for baseball or softball and opens and closes the catching tool for baseball or softball. Therefore, some sporting goods stores provide a service of adjusting the hardness of a catching tool by hitting or stretching the catching tool until hardness desired by a user is obtained.

However, for a product evaluated by the user's sense, it is difficult for the user himself/herself or the store side to appropriately determine how much adjustment should be performed. That is, in a case where the hardness of the measurement object is evaluated by an individual sense, there is no appropriate method for quantitatively evaluating the hardness. Therefore, it is not possible to prepare a product for each user in advance, and there is a problem that it takes time for adjustment with a customer for each store.

SUMMARY OF THE INVENTION

The present invention has been made in view of the above problems, and an object of the present invention is to provide an object hardness measuring device and an object hardness measuring method, both of which are capable of quantitatively evaluating hardness of a measurement object.

An object hardness measuring device of the present invention is a measuring device for measuring hardness of a measurement object. An object hardness measuring device includes a first side portion, a second side portion, a pedestal unit, a load unit, a measuring unit, and a holding unit. The first side portion presses one side surface of the measurement object. The second side portion presses a symmetrical side surface of the measurement object, the symmetrical side surface being symmetrical with the one side surface of the measurement object. The pedestal unit includes a bottom plate and a slide rail unit attached to a top surface of the bottom plate. The pedestal unit is movable on the second side portion with respect to the first side portion. The load unit applies a load to the measurement object by moving the second side portion with respect to the first side portion via the pedestal unit such that the first side portion presses the one side surface and the second side portion presses the symmetrical side surface. The measuring unit is able to measure, in a state where the load acts on the measurement object, at least one of a movement distance of the second side portion with respect to the first side portion and a change amount of the load when the second side portion is moved either at a predetermined speed or to a predetermined position. The holding unit is connected onto the slide rail unit of the pedestal unit. The holding unit is able to hold the measurement object, and is movable between the first side portion and the second side portion by the slide rail unit.

An object hardness measuring method of the present invention is a measuring method for measuring hardness of a measurement object. The object hardness measuring method includes the following steps. A second side portion is moved with respect to a first side portion by a pedestal unit including a bottom plate and a slide rail unit attached to a top surface of the bottom plate such that the first side portion is in contact with one side surface of the measurement object and the second side portion is in contact with a symmetrical side surface of the measurement object, the symmetrical side surface being symmetrical with the one side surface of the measurement object. The measurement object is held by a holding unit connected onto the slide rail unit of the pedestal unit, and moving the holding unit between the first side portion and the second side portion by the slide rail unit. A load acting on the measurement object by the first side portion and the second side portion when the second side portion is moved with respect to the first side portion such that the first side portion presses the one side surface and the second side portion presses the symmetrical side surface, and at least one of a movement distance of the second side portion with respect to the first side portion and a change amount of the load when the second side portion is moved either at a predetermined speed or to a predetermined position are measured.

According to the object hardness measuring device and the object hardness measuring method of the present invention, the hardness of the measurement object can be quantitatively evaluated.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
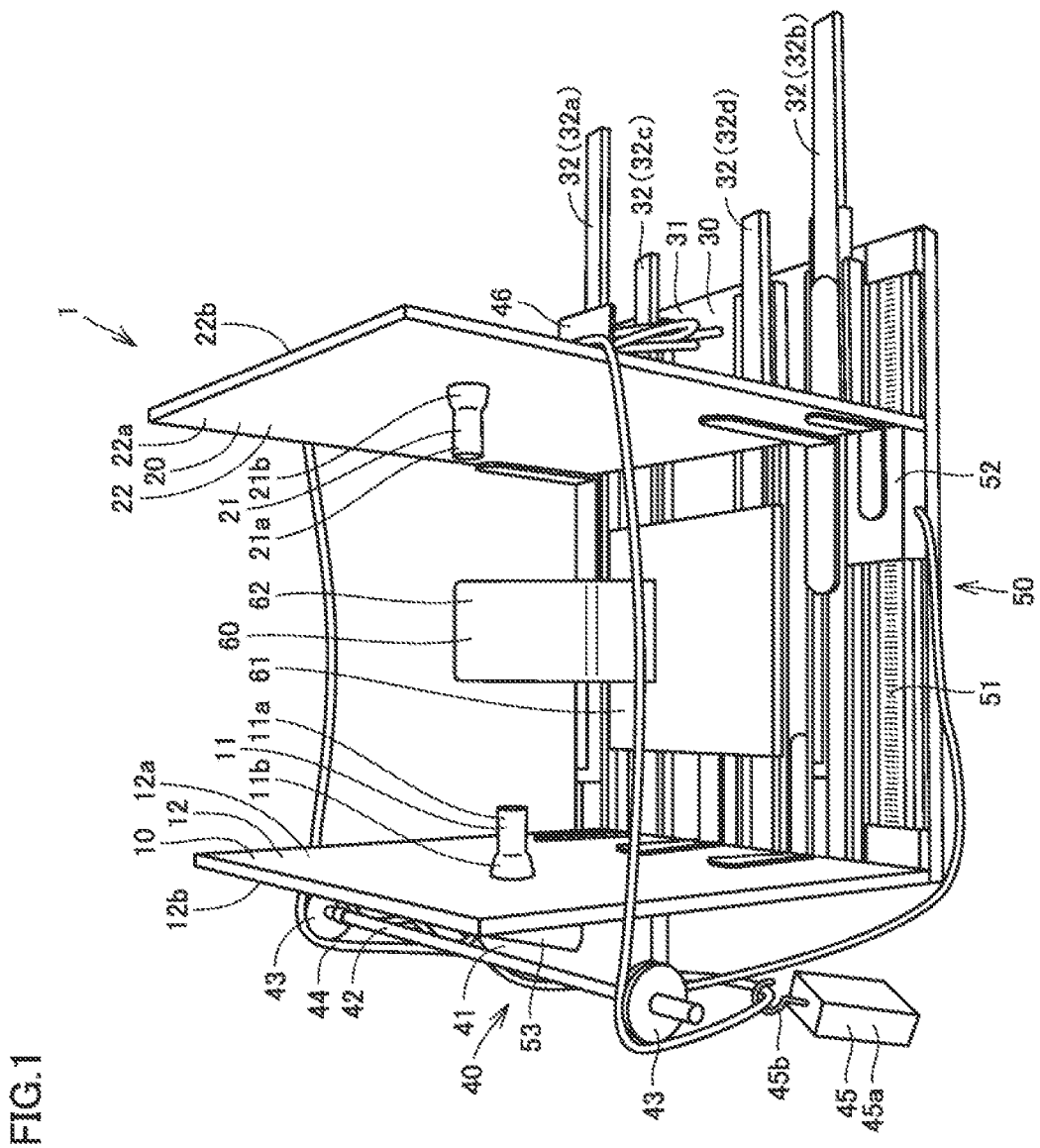
FIG. 1 is a perspective view schematically illustrating a configuration of an object hardness measuring device according to an embodiment.

Embodiments of the present invention will be described below with reference to the drawings. In the following drawings, unless otherwise specified, the same or corresponding parts are denoted by the same reference numerals, and description thereof will not be repeated.

With reference to FIGS. 1 to 5, a configuration of a hardness measuring device 1 for measuring hardness of a measurement object 100 according to an embodiment will be described.

Figure 2:
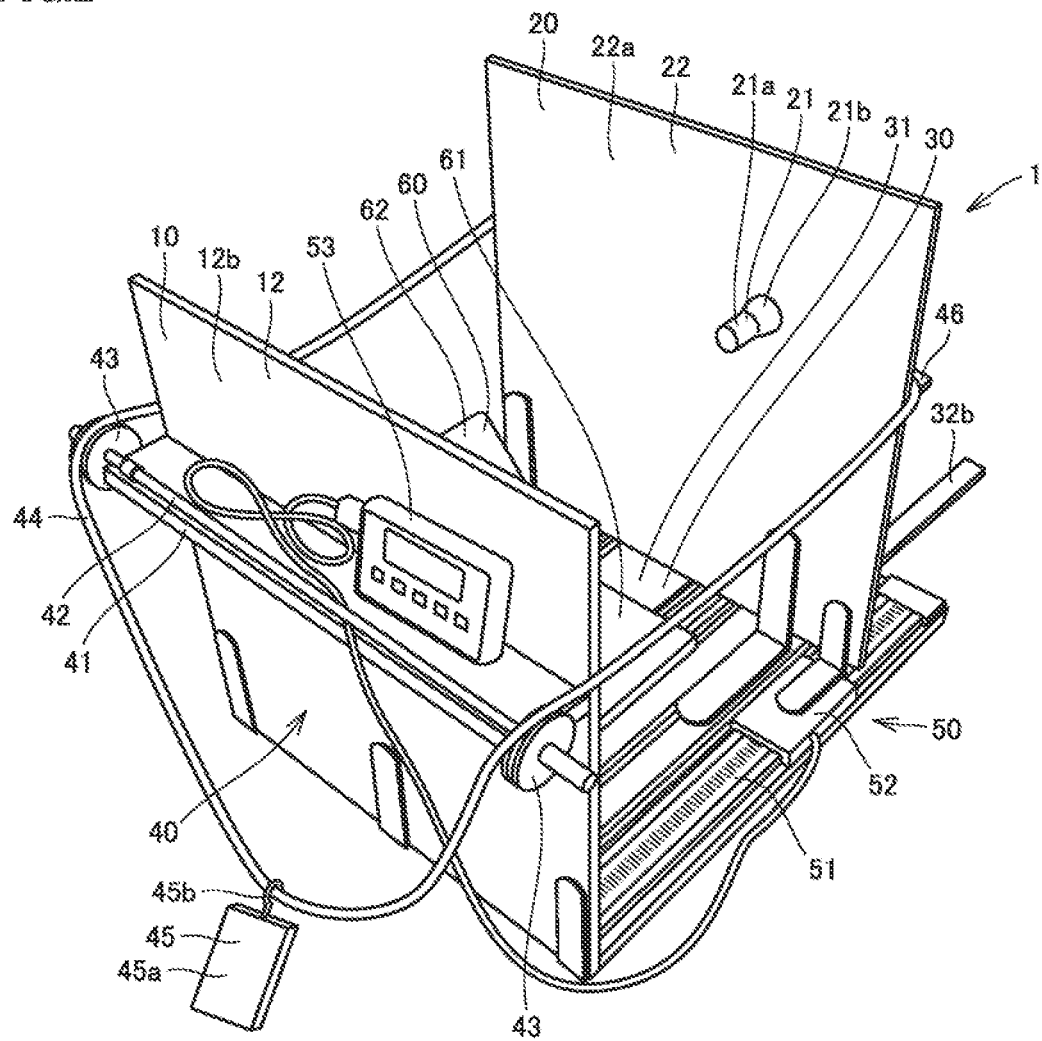
FIG. 2 is a perspective view schematically illustrating a configuration of the object hardness measuring device according to the embodiment, from a side of a first side portion.

As shown in FIGS. 1 and 2, hardness measuring device 1 of the present invention is a measuring device for measuring hardness of measurement object 100. In the present embodiment, a catching tool for baseball or softball is taken as an example of measurement object 100. Hardness of the catching tool for baseball or softball is a value the device of the present invention indicates a bending resistance felt by a user when the catching tool is opened and closed as an objective numerical value. Measurement object 100 is not limited to a catching tool for baseball or softball, and may be a bag, shoes, a pillow, and the like.

Object hardness measuring device 1 according to the embodiment mainly includes a first side portion 10, a second side portion 20, a pedestal unit 30, a load unit 40, a measuring unit 50, and a holding unit 60.

First side portion 10 and second side portion 20 are arranged to face each other. First side portion 10 includes a first protrusion 11 and a first side plate 12. First side portion 10 is for pressing one side surface (thumb-side outer surface) 101 (see FIG. 6) of measurement object 100.

One side surface (thumb-side outer surface) 101 of measurement object 100 is a side surface of measurement object 100 on a side of the thumb in the present example. One side surface (thumb-side outer surface) 101 of measurement object 100 is a side surface of a thumb portion into which the thumb of measurement object 100 is inserted and on a side opposite to the little finger.

First side plate 12 is formed in a rectangular plate shape. First side plate 12 includes a first inner surface 12a facing second side portion 20 and a first outer surface 12b disposed on a side opposite to first inner surface 12a. First protrusion 11 is attached to first inner surface 12a of first side plate 12. First protrusion 11 presses one side surface (thumb side surface) 101 of measurement object 100. First protrusion 11 is disposed according to the shape and deformation during pressing of the measurement object.

First protrusion 11 protrudes from first side plate 12 toward second side portion 20. First protrusion 11 includes a first tip 11a and a first root 11b. First tip 11a protrudes from first root 11b toward second side portion 20. First tip 11a is formed in a columnar shape. First root 11b is attached to first inner surface 12a of first side plate 12. First root 11b is provided such that its outer diameter increases from first tip 11a toward first side plate 12. First root 11b is formed in a truncated cone shape. First root 11b on a root side is thick so that a force is stably applied at the time of pressing.

First protrusion 11 is attached to first side plate 12 in a positionally changeable manner. First protrusion 11 is detachably attached to first inner surface 12a of first side plate 12 facing a second side plate 22 using an adhesive. First protrusion 11 may be detachably attached to first side plate 12 by being inserted into and removed from any of a plurality of holes provided in first inner surface 12a.

Second side portion 20 is movable with respect to first side portion 10. Second side portion 20 includes a second protrusion 21 and second side plate 22. Second side portion 20 is for pressing a symmetrical side surface (little-finger-side outer surface) 102 (see FIG. 6) of measurement object 100. Symmetrical side surface (little-finger-side outer surface) 102 of measurement object 100 is disposed on the symmetric side with respect to one side surface (thumb side surface) 101.

Symmetrical side surface (little-finger-side outer surface) 102 of measurement object 100 is a side surface on the little finger side of measurement object 100. Symmetrical side surface (little-finger-side outer surface) 102 of measurement object 100 is a side surface of a little finger portion into which the little finger of measurement object 100 is inserted and on a side opposite to the thumb.

Similarly to first side plate 12, second side plate 22 is formed in a rectangular plate shape. Both first side plate 12 and second side plate 22 may have any size and any shape, including a disk shape, with which first protrusion 11 and second protrusion 21 may be brought into contact with measurement object 100. Second side plate 22 includes a second inner surface 22a facing first side portion 10 and a second outer surface 22b disposed on a side opposite of second inner surface 22a. Second protrusion 21 is attached to second inner surface 22a of second side plate 22. Second protrusion 21 presses symmetrical side surface (little finger side surface) 102 of measurement object 100.

Second protrusion 21 protrudes from second side plate 22 toward first side portion 10. Second protrusion 21 includes a second tip 21a and a second root 21b. Second tip 21a protrudes from second root 21b toward first side portion 10. Second tip 21a is formed in a columnar shape. Second root 21b is attached to second inner surface 22a of second side plate 22. Second root 21b has an outer diameter that increases from second tip 21a toward second side plate 22. Second root 21b is formed in a truncated cone shape.

Second protrusion 21 is attached to second side plate 22 in a positionally changeable manner. Second protrusion 21 is detachably attached to second inner surface 22a of second side plate 22 facing first side plate 12 using an adhesive. Second protrusion 21 may be detachably attached to second side plate 22 by being inserted into and removed from any of a plurality of holes provided in second inner surface 22a. First protrusion 11 and second protrusion 21 are disposed according to the shape and change during pressing of measurement object 100.

Each of first side plate 12 and second side plate 22 is attached to pedestal unit 30. First side plate 12 and second side plate 22 are attached to pedestal unit 30 such that a distance therebetween changes on pedestal unit 30.

Pedestal unit 30 is able to move second side portion 20 with respect to first side portion 10. Pedestal unit 30 includes a bottom plate 31 and a slide rail unit 32. A bottom surface of bottom plate 31 is a surface on which pedestal unit 30 is placed on the ground or the like. Slide rail unit 32 is attached to atop surface of bottom plate 31. Slide rail unit 32 includes a first slide rail 32a, a second slide rail 32b, a third slide rail 32c, and a fourth slide rail 32d. The slide rails are for specifying a moving direction of second side portion 20 with respect to first side portion 10, and is not limited to the slide rails of this example. The number of slide rails may be one as long as the moving direction can be limited.

First side plate 12 is fixed to the top surface of bottom plate 31 of pedestal unit 30. In the present embodiment, first side plate 12 is fixed to the top surface of bottom plate 31 of pedestal unit 30 by an L-shaped fitting. Therefore, first side plate 12 does not move with respect to pedestal unit 30.

Second side plate 22 is fixed to first slide rail 32a and second slide rail 32b attached to the top surface of bottom plate 31 of pedestal unit 30. In the present embodiment, second side plate 22 is fixed to first slide rail 32a and second slide rail 32b attached to the top surface of bottom plate 31 of pedestal unit 30 by L-shaped fittings. First slide rail 32a and second slide rail 32b are able to move second side portion 20 with respect to first side portion 10 in a direction in which first side portion 10 and second side portion 20 face each other. Therefore, second side plate 22 is movable with respect to first side plate 12.

Load unit 40 applies a load to measurement object 100 by moving second side portion 20 with respect to first side portion 10 via pedestal unit 30 such that first side portion 10 presses one side surface (thumb-side outer surface) 101 (see FIG. 6) of measurement object 100, and second side portion 20 presses symmetrical side surface (little-finger-side outer surface) 102 (see FIG. 6) of measurement object 100.

Load unit 40 includes a fixing base 41, a shaft unit 42, a pair of pulleys 43, a string 44, a force gauge 45, and a locking unit 46. String 44 of load unit 40 can be substituted by a wire or the like. Force gauge 45 can be substituted by a plurality of weights (constant loads).

Fixing base 41 is fixed to first outer surface 12b of first side plate 12. Fixing base 41 is formed in a plate shape. Shaft unit 42 is fixed to a top surface of fixing base 41. Shaft unit 42 is formed in a cylindrical shape. Both ends of shaft unit 42 project outward from fixing base 41. Each of the pair of pulleys 43 is attached to each of the both ends of shaft unit 42. The pair of pulleys 43 is rotatable about shaft unit 42. A through hole is provided at the center of each of the pair of pulleys 43. Shaft unit 42 is inserted into the through hole of each of the pair of pulleys 43. A groove is provided on an outer peripheral surface of each of the pair of pulleys 43. The grooves of the pair of pulleys 43 are provided such that string 44 is fitted.

Figure 3:
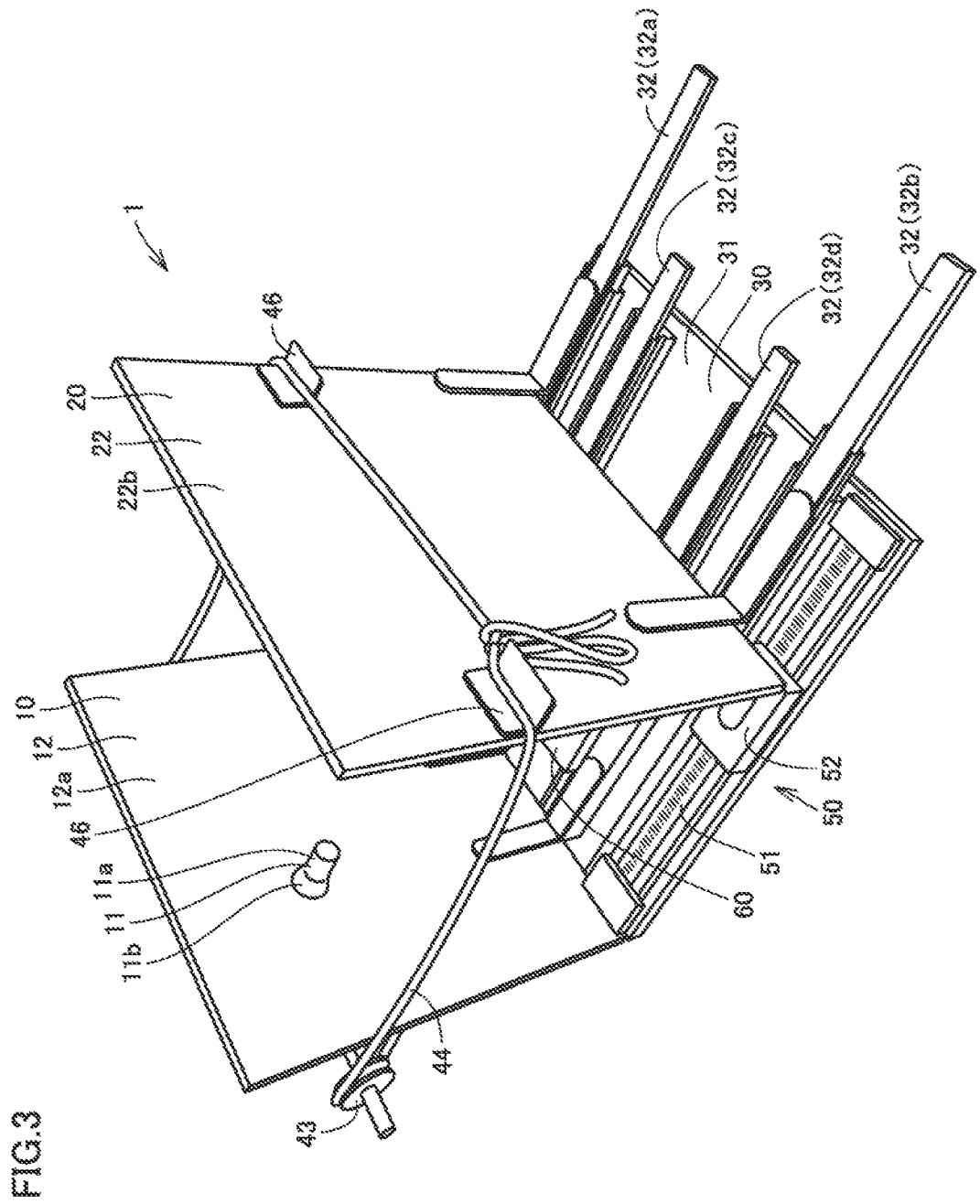
FIG. 3 is a perspective view schematically illustrating a configuration of the object hardness measuring device according to the embodiment, from a side of a second side portion.

As illustrated in FIGS. 2 and 3, string 44 is formed in a ring shape. In the present embodiment, both ends of string 44 are tied together, so that string 44 is formed into a ring shape. String 44 surrounds first side portion 10 and second side portion 20. String 44 is locked to locking unit 46 attached to second outer surface 22b of second side plate 22. String 44 is placed on a top surface of locking unit 46. Locking unit 46 is disposed at substantially the same height position as fixing base 41.

Force gauge 45 is attached to string 44 between the pair of pulleys 43. Force gauge 45 includes a main body portion 45a and a hook 45b. Main body portion 45a is able to display a load acting on hook 45b. Hook 45b is attached to string 44. Further, a weight may be attached to string 44 instead of force gauge 45.

Measuring unit 50 is able to measure, in a state where a load acts on measurement object 100, at least one of a movement distance of second side portion 20 with respect to first side portion 10, and a change amount of the load when second side portion 20 is moved either at a predetermined speed or to a predetermined position. Measuring unit 50 is able to measure a distance between first side portion 10 and second side portion 20.

In the present embodiment, measuring unit 50 is a linear scale. Measuring unit 50 includes a scale 51, a detector 52, and a display unit 53. Scale 51 extends along the direction in which first side portion 10 and second side portion 20 face each other. Detector 52 is able to detect position information from scale 51. Display unit 53 displays a change in the distance between first side portion 10 and second side portion 20 from the position information detected by detector 52. In the present embodiment, display unit 53 is placed on a top surface of fixing base 41.

Figure 4:
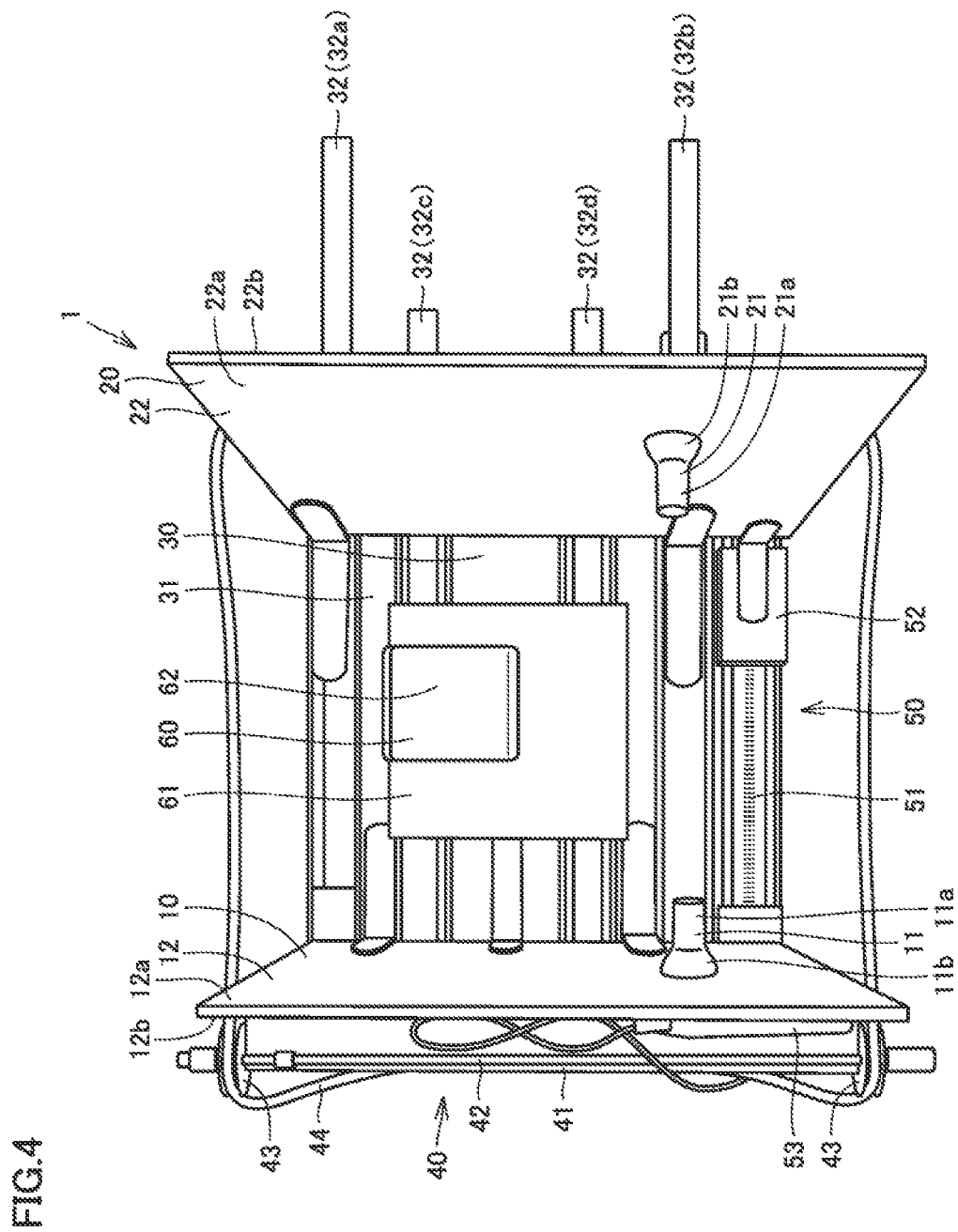
FIG. 4 is a plan view schematically illustrating a configuration of the object hardness measuring device according to the embodiment.

As illustrated in FIGS. 1 and 4, holding unit 60 is disposed between first side portion 10 and second side portion 20. Holding unit 60 is connected to pedestal unit 30. Holding unit 60 is connected onto slide rail unit 32 of pedestal unit 30. Holding unit 60 is able to hold measurement object 100. Holding unit 60 is able to hold measurement object 100 in a state being inserted into a hand insertion portion 103 (see FIG. 6) of measurement object 100.

Holding unit 60 is movable by slide rail unit 32 between first side portion 10 and second side portion 20. Holding unit 60 is fixed to third slide rail 32c and fourth slide rail 32d attached to the top surface of bottom plate 31 of pedestal unit 30. Third slide rail 32c and fourth slide rail 32d are able to move holding unit 60 in the direction in which first side portion 10 and second side portion 20 face each other. The moving direction of holding unit 60 is parallel to the moving direction of second side portion 20.

Figure 5:
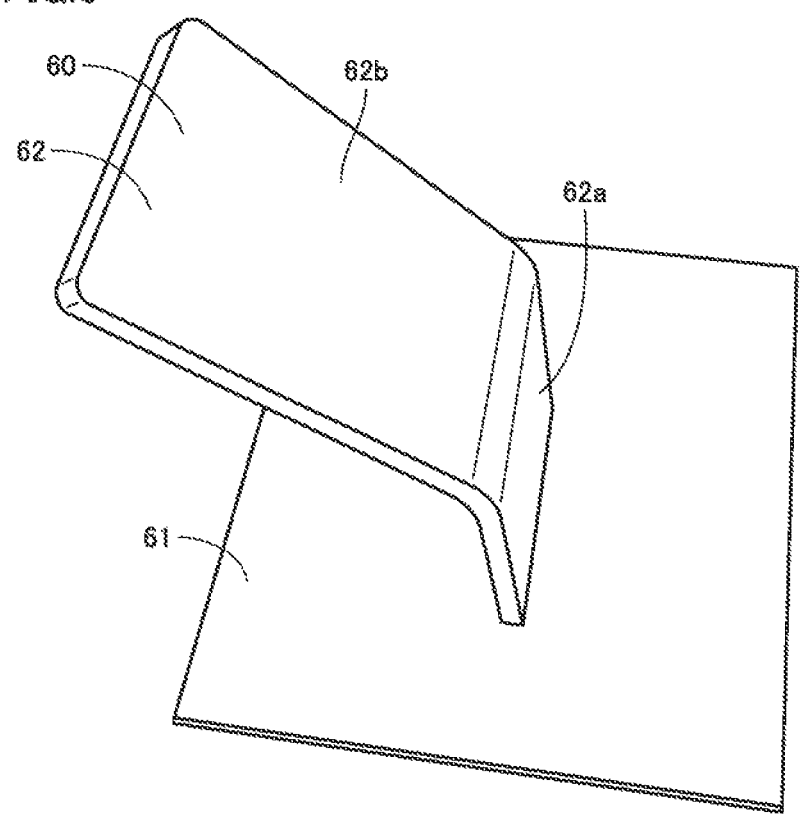
FIG. 5 is a perspective view schematically illustrating a configuration of a holding unit of the object hardness measuring device according to the embodiment.

As illustrated in FIGS. 4 and 5, holding unit 60 includes a base portion 61 and a protrusion 62. Base portion 61 is formed in a plate shape. Base portion 61 is formed in a rectangular shape. Base portion 61 is attached to third slide rail 32c and fourth slide rail 32d. Base portion 61 is movable along third slide rail 32c and fourth slide rail 32d.

Protrusion 62 protrudes from base portion 61. Specifically, protrusion 62 protrudes from base portion 61 to a side opposite to pedestal unit 30. Protrusion 62 is bent. Protrusion 62 includes a straight portion 62a and an inclined portion 62b. Straight portion 62a is connected to base portion 61. Inclined portion 62b is connected to straight portion 62a on a side opposite to base portion 61. Inclined portion 62b is inclined with respect to base portion 61. Inclined portion 62b is inclined toward a back surface side of measurement object 100.

With reference to FIGS. 6 to 9, a state in which measurement object 100 is attached to hardness measuring device 1 for measuring hardness of measurement object 100 according to the embodiment will be described.

Figure 6:
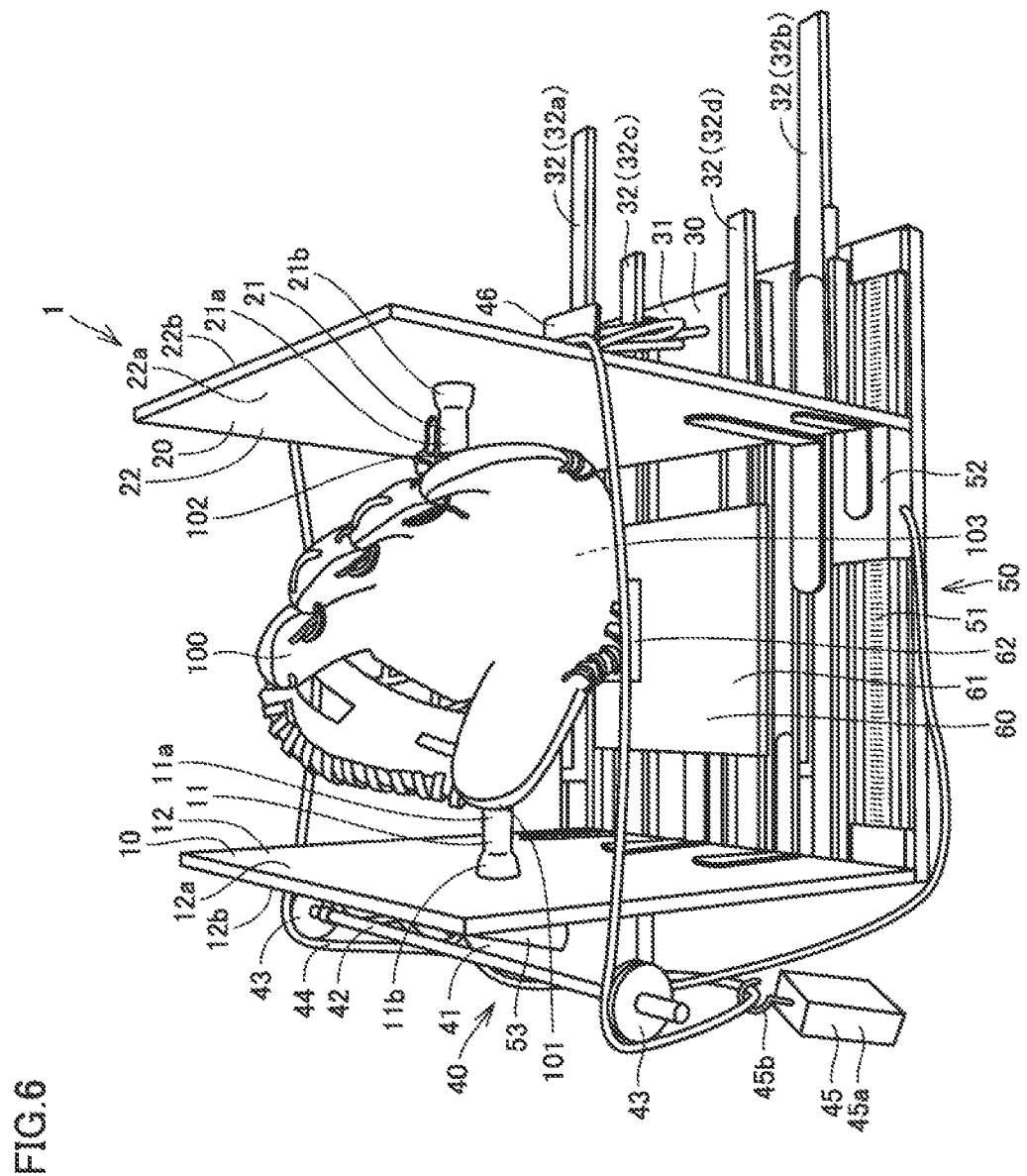
FIG. 6 is a perspective view schematically illustrating an object hardness measuring method according to an embodiment.
Figure 7:
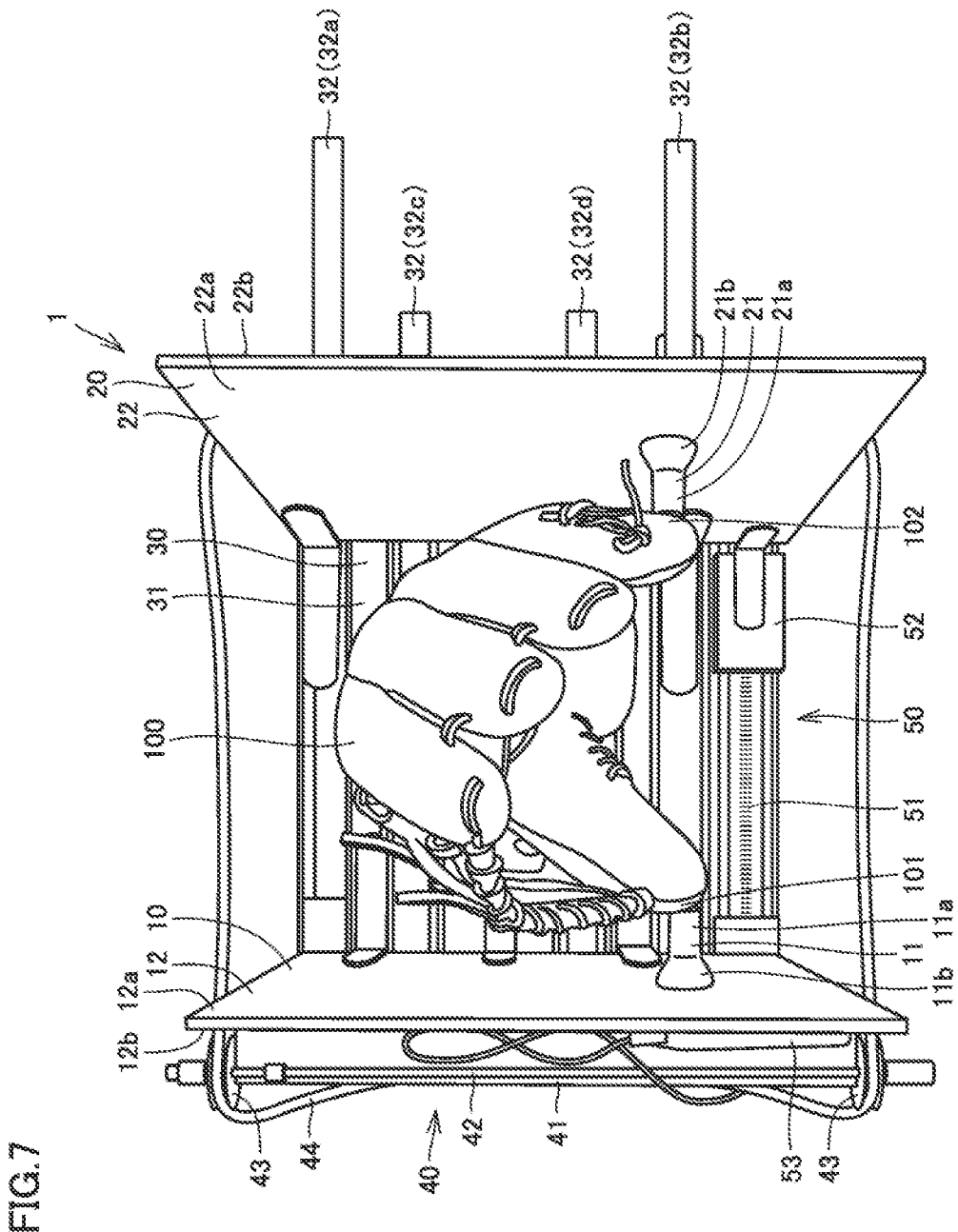
FIG. 7 is a top view schematically illustrating the object hardness measuring method according to the embodiment.

As illustrated in FIGS. 6 and 7, measurement object 100 is held by holding unit 60 between first side portion 10 and second side portion 20. First protrusion 11 is disposed so as to press thumb-side outer surface 101 of measurement object 100. Second protrusion 21 is disposed so as to press little-finger-side outer surface 102 of measurement object 100.

Figure 8:
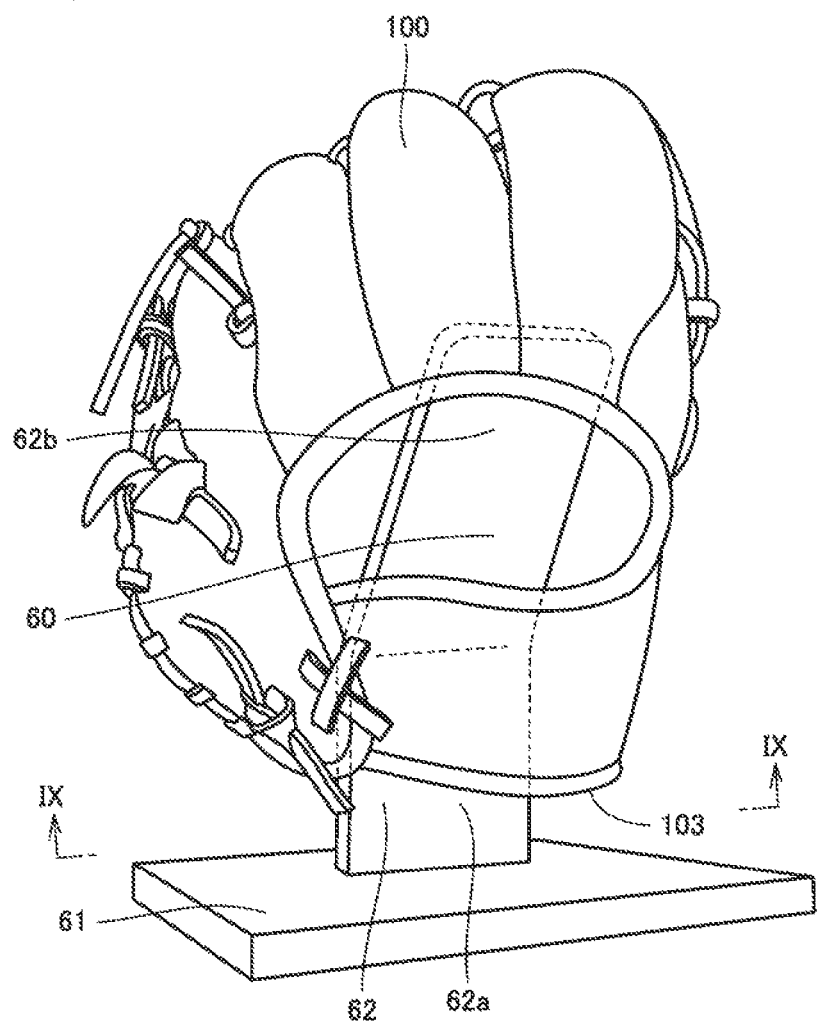
FIG. 8 is a perspective view schematically illustrating a state in which a measurement object is attached to a holding unit of an object hardness measuring device according to an embodiment.

As illustrated in FIG. 8, protrusion 62 of holding unit 60 is inserted from hand insertion portion 103 of measurement object 100. Protrusion 62 of holding unit 60 is inserted into measurement object 100 from hand insertion portion 103 of measurement object 100.

Figure 9:
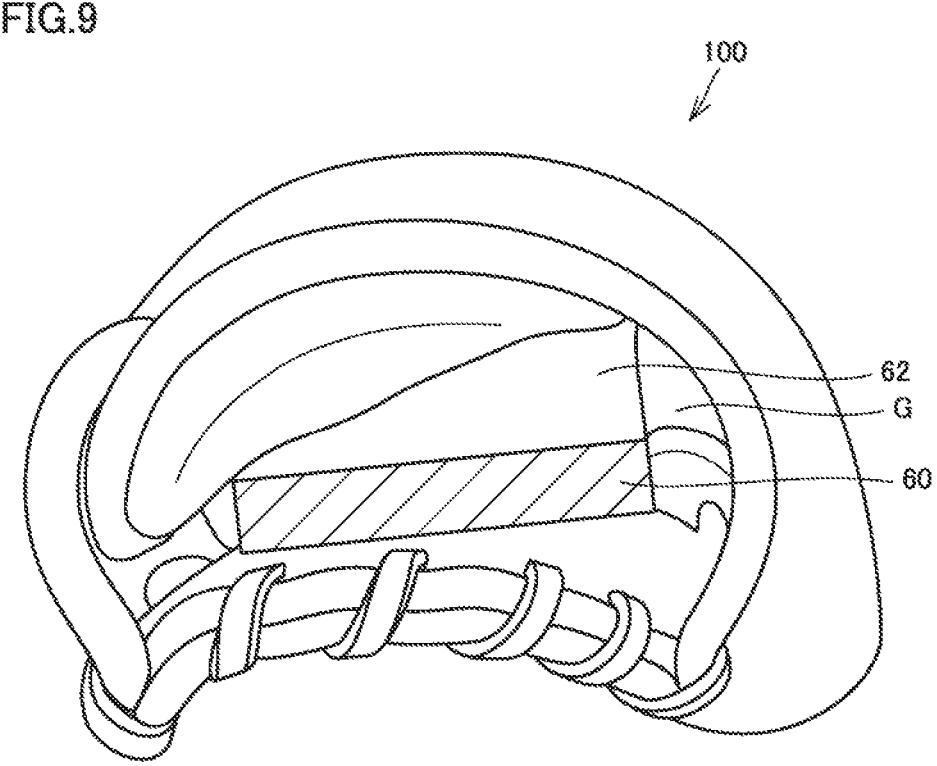
FIG. 9 is a cross-sectional view taken along line IX-IX of FIG. 8.

As illustrated in FIG. 9, protrusion 62 is disposed such that a gap G is provided between protrusion 62 and hand insertion portion 103 in a state being inserted into hand insertion portion 103 of measurement object 100. Protrusion 62 is movable in an opening of hand insertion portion 103 in a state being inserted into hand insertion portion 103 of measurement object 100.

Next, a hardness measuring method for measuring hardness of measurement object 100 according to the embodiment will be described with reference to FIGS. 6 and 7.

The hardness measuring method for measuring hardness of measurement object 100 according to the embodiment is a measuring method for measuring the hardness of measurement object 100.

The hardness measuring method for measuring the hardness of measurement object 100 according to the embodiment includes the following steps.

Second side portion 20 is moved with respect to first side portion 10 by pedestal unit 30 including bottom plate 31 and slide rail unit 32 attached to the top surface of bottom plate 31 such that first side portion 10 is in contact with one side surface (thumb-side outer surface) 101 of measurement object 100 and second side portion 20 is in contact with symmetrical side surface (little-finger-side outer surface) 102 of measurement object 100. Measurement object 100 is held by holding unit 60 connected onto slide rail unit 32 of pedestal unit 30. Holding unit 60 is moved by slide rail unit 32 between first side portion 10 and second side portion 20. In the present embodiment, first protrusion 11 of first side portion 10 is in contact with one side surface (thumb-side outer surface) 101 of measurement object 100, and second protrusion 21 of second side portion 20 is in contact with symmetrical side surface (little-finger-side outer surface) 102 of measurement object 100.

A load acting on measurement object 100 by first side portion 10 and second side portion 20 when second side portion 20 is moved with respect to first side portion 10 such that first side portion 10 presses one side surface (thumb-side outer surface) 101 and second side portion 20 presses symmetrical side surface (little-finger-side outer surface) 102, and at least one of a movement distance of second side portion 20 with respect to first side portion 10 and a change amount of the load when second side portion 20 is moved either at a predetermined speed or to a predetermined position are measured.

Next, the hardness measuring method for measuring the hardness of measurement object 100 according to the embodiment will be described more specifically.

Protrusion 62 of holding unit 60 is inserted from hand insertion portion 103 of measurement object 100. In this state, measurement object 100 is held by holding unit 60. Measurement object 100 is disposed such that thumb-side outer surface 101 of measurement object 100 faces first side portion 10 and little-finger-side outer surface 102 of measurement object 100 faces second side portion 20.

A position of first protrusion 11 of first side portion 10 is changed so as to be in contact with thumb-side outer surface 101 of measurement object 100. Since a thumb of measurement object 100 is easily moved inward by inserting a hard core and fixing it with a leather string, the position of first protrusion 11 is set so as to be in contact with a position below an upper part of the leather string by 10 mm, for example. A diameter of a tip of first protrusion 11 is, for example, 15 mm. A position of second protrusion 21 of second side portion 20 is changed so as to be in contact with little-finger-side outer surface 102 of measurement object 100. Since a little finger of measurement object 100 is easily moved inward by inserting a hard core and fixing it with a leather string, the position of second protrusion 21 is set so as to be in contact with a position below an upper part of the leather string by 10 mm, for example. A diameter of a tip of second protrusion 21 is, for example, 15 mm.

First side portion 10 and second side portion 20 are disposed such that first protrusion 11 of first side portion 10 is in contact with thumb-side outer surface 101 of measurement object 100 and second protrusion 21 of second side portion 20 is in contact with little-finger-side outer surface 102 of measurement object 100.

String 44 is passed through second outer surface 22b of second side portion 20 and through the grooves of the pair of pulleys 43. In a state where first protrusion 11 of first side portion 10 is in contact with thumb-side outer surface 101 of measurement object 100, where second protrusion 21 of second side portion 20 is in contact with little-finger-side outer surface 102 of measurement object 100, and where no load is applied, an initial value of the linear scale as measuring unit 50 is set to 0. Further, an initial value of force gauge 45 is set to 0.

When second side portion 20 is moved with respect to first side portion 10 from this state, such that first protrusion 11 presses thumb-side outer surface 101 and second protrusion 21 presses little-finger-side outer surface 102, a load acting on measurement object 100 by first protrusion 11 and second protrusion 21 and a movement distance of second side portion 20 with respect to first side portion 10 are measured. The movement at this time may be performed manually or automatically as long as the movement distance and the force can be simultaneously measured.

The load acting on measurement object 100 is, for example, 0 g or more and 1000 g or less. Here, the load acting on measurement object 100 may be a constant load. When the measurement is performed using a plurality of constant loads, the measurement is performed after deformation of measurement object 100 becomes constant.

While string 44 is pulled by force gauge 45, a value of force gauge 45 is read and a value of the linear scale is read. The value of force gauge 45 and the value of the linear scale may be recorded in video. In the case of video recording, the force at the time of pressing is measured from force gauge 45, and the movement distance is measured from the linear scale.

Next, a modification of hardness measuring device 1 for measuring hardness of measurement object 100 according to the present embodiment will be described with reference to FIG. 10.

Figure 10:
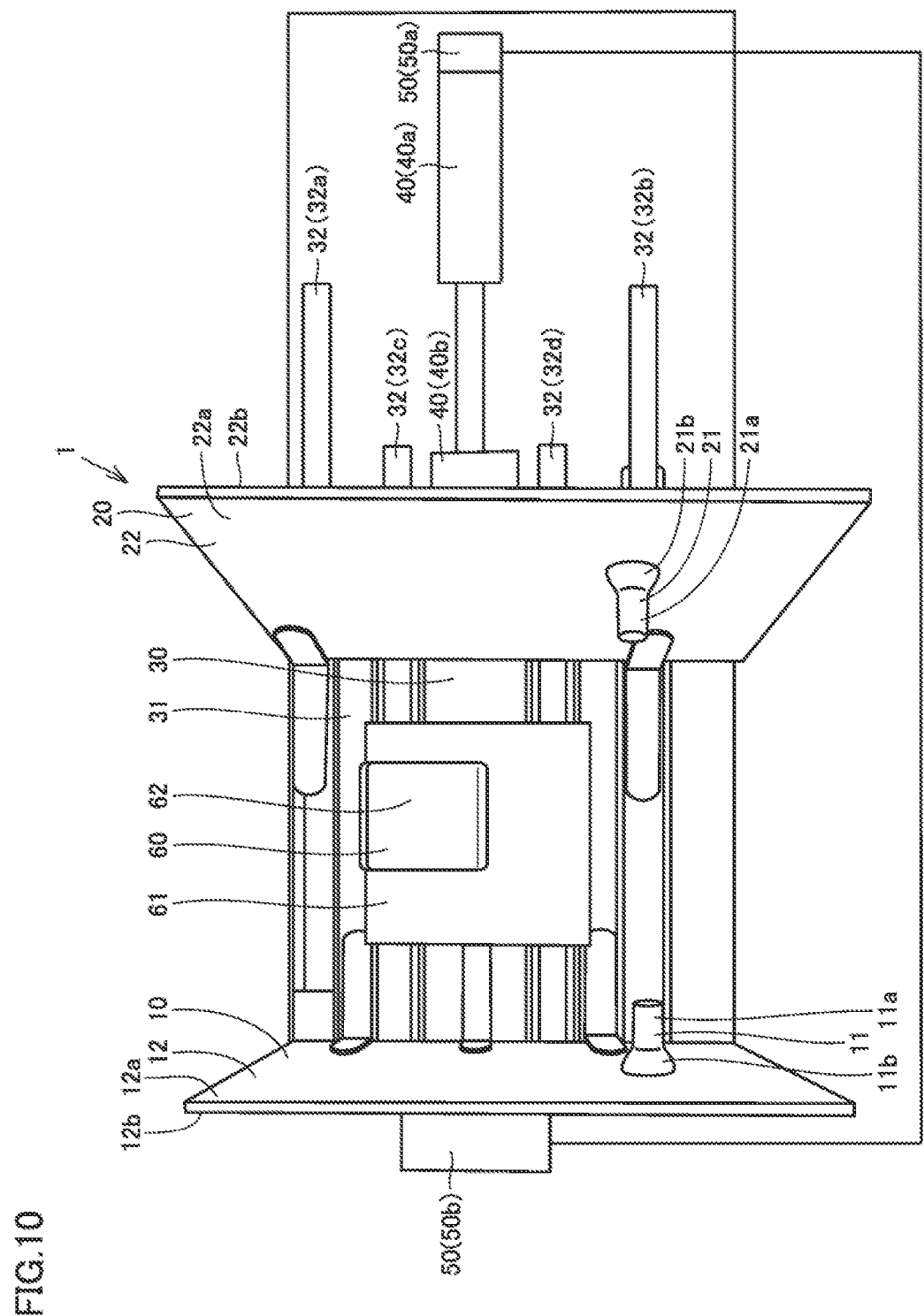
FIG. 10 is a plan view schematically illustrating a configuration of a modification of the object hardness measuring device according to the embodiment.

As illustrated in FIG. 10, in the modification of hardness measuring device 1 for measuring hardness of measurement object 100 according to the present embodiment, the configurations of load unit 40 and measuring unit 50 are mainly different from those of above hardness measuring device 1 for measuring hardness of measurement object 100.

Load unit 40 is attached to second side portion 20 and pedestal unit 30. Load unit 40 includes a main body 40a and a moving unit 40b. Main body 40a is placed on pedestal unit 30. Moving unit 40b is movable with respect to main body 40a. Moving unit 40b is attached to second side portion 20. Moving unit 40b is movable in the direction in which first side portion 10 and second side portion 20 face each other. Moving unit 40b is moved by a motor.

Measuring unit 50 is able to measure a change amount of a load when second side portion 20 is moved either at a predetermined speed or to a predetermined position. Measuring unit 50 is attached to first side portion 10 and load unit 40. Measuring unit 50 includes a detector 50*a* and a pressure sensor 50*b*. Detector 50*a* is connected to load unit 40. Detector 50*a* is connected to pressure sensor 50*b*. Detector 50*a* detects the moving speed or the movement distance of second side portion 20 under the control of the motor of moving unit 40*b*. Measuring unit 50 is able to measure the moving speed or the movement distance of second side portion 20 under the control of the motor of moving unit 40*b*.

Pressure sensor 50*b* is attached to first side portion 10. Pressure sensor 50*b* detects a change amount of a load acting on first side portion 10 from load unit 40 via measurement object 100. Measuring unit 50 is able to measure a change amount of the load acting on first side portion 10 by pressure sensor 50*b*.

Next, a modification of the hardness measuring method for measuring the hardness of measurement object 100 according to the present embodiment will be described.

In the modification of the hardness measuring method for measuring the hardness of measurement object 100 according to the present embodiment, the change amount of the load when second side portion 20 is moved either at a predetermined speed or to a predetermined position is measured. Specifically, moving unit 40*b* of load unit 40 is moved by the motor and moves second side portion 20 to which moving unit 40*b* is attached either at a predetermined speed or to a predetermined position. The change amount of the load at this time is measured by measuring unit 50.

Next, operational effects according to the present embodiment will be described.

According to hardness measuring device 1 for measuring hardness of measurement object 100 according to the embodiment, measuring unit 50 is able to measure, in a state where a load acts on measurement object 100, at least one of a movement distance of second side portion 20 with respect to first side portion 10, and a change amount of the load when second side portion 20 is moved either at a predetermined speed or to a predetermined position. As a result, the hardness of measurement object 100 can be measured by measuring device 1, instead of the user's sense. Therefore, the hardness of measurement object 100 can be quantitatively evaluated.

In addition, holding unit 60 is movable by slide ail unit 32 between first side portion 10 and second side portion 20. As a result, the direction of the force acting on measurement object 100 can be made constant along the direction in which slide rail unit 32 extends.

According to hardness measuring device 1 for measuring hardness of measurement object 100 of the embodiment, first protrusion 11 presses one side surface (thumb-side outer surface) 101 of measurement object 100, and second protrusion 21 presses symmetrical side surface (little-finger-side outer surface) 102 of measurement object 100. As a result, it is possible to limit a portion to be measured. Since measurement object 100 is pressed from side surfaces, there is no influence of gravity when measurement object 100 is measured. In addition, since a deformed portion of measurement object 100 can be specified with precision, it is possible to perform more accurate evaluation as compared to the case in which pressing is carried out with a surface or the like.

According to hardness measuring device 1 for measuring hardness of measurement object 100 of the embodiment, the moving direction of holding unit 60 is parallel to the moving direction of second side portion 20. Therefore, when measurement object 100 is held by holding unit 60, it is easy to adjust a position of measurement object 100. In addition, since the moving direction is parallel and the moving direction is constrained in one direction, friction is small, and measurement can be accurately performed.

According to hardness measuring device 1 for measuring hardness of measurement object 100 of the embodiment, first protrusion 11 is attached to first side plate 12 in a positionally changeable manner, and second protrusion 21 is attached to second side plate 22 in a positionally changeable manner. Therefore, positions of first protrusion 11 and second protrusion 21 can be changed according to measurement object 100. By changing the positions, portions to be pressed can be adjusted according to the shape and deformation of measurement object 100. In addition, since a portion to be deformed can be pressed with precision, more accurate measurement can be performed.

According to hardness measuring device 1 for measuring hardness of measurement object 100 of the embodiment, measurement object 100 is a catching tool for baseball or softball. As a result, hardness of the catching tool for baseball or softball can be quantitatively evaluated.

According to hardness measuring device 1 for measuring hardness of measurement object 100 of the embodiment, protrusion 62 is disposed such that gap G is provided between protrusion 62 and hand insertion portion 103 in a state being inserted into hand insertion portion 103 of the catching tool for baseball or softball. Therefore, when the catching tool for baseball or softball is held by holding unit 60, it is easier to adjust the position of the catching tool for baseball or softball.

According to the hardness measuring method for measuring the hardness of measurement object 100 of the embodiment, a load acting on measurement object 100 by first side portion 10 and second side portion 20 when second side portion 20 is moved with respect to first side portion 10 such that first side portion 10 presses one side surface (thumb-side outer surface) 101 of measurement object 100 and second side portion 20 presses symmetrical side surface (little-finger-side outer surface) 102 of measurement object 100, and at least one of a movement distance of second side portion 20 with respect to first side portion 10 and a change amount of the load when second side portion 20 is moved either at a predetermined speed or to a predetermined position are measured. As a result, the hardness of measurement object 100 can be measured not by the user's sense but by the load acting on measurement object 100 by first protrusion 11 and second protrusion 21 and the movement distance of second side portion 20 with respect to first side portion 10. Therefore, the hardness of measurement object 100 can be quantitatively evaluated.

Next, another hardness measuring device 1 for measuring hardness of measurement object 100 and the hardness measuring method for measuring hardness of measurement object 100 according to the embodiment will be described. Unless otherwise specified, another hardness measuring device 1 for measuring hardness of measurement object 100 and the hardness measuring method for measurement object 100 according to the embodiment have the same configuration, the same measurement method, and the same effects as those of hardness measuring device 1 for measuring hardness of measurement object 100 and the hardness measuring method for measuring hardness of measurement object 100 according to the above embodiment. Therefore, the same components as those of hardness measuring device 1 for measuring hardness of measurement object 100 and the hardness measuring method for measuring hardness of measurement object 100 according to the above embodiment are denoted by the same reference numerals, and descriptions thereof will not be repeated.

Figure 11:
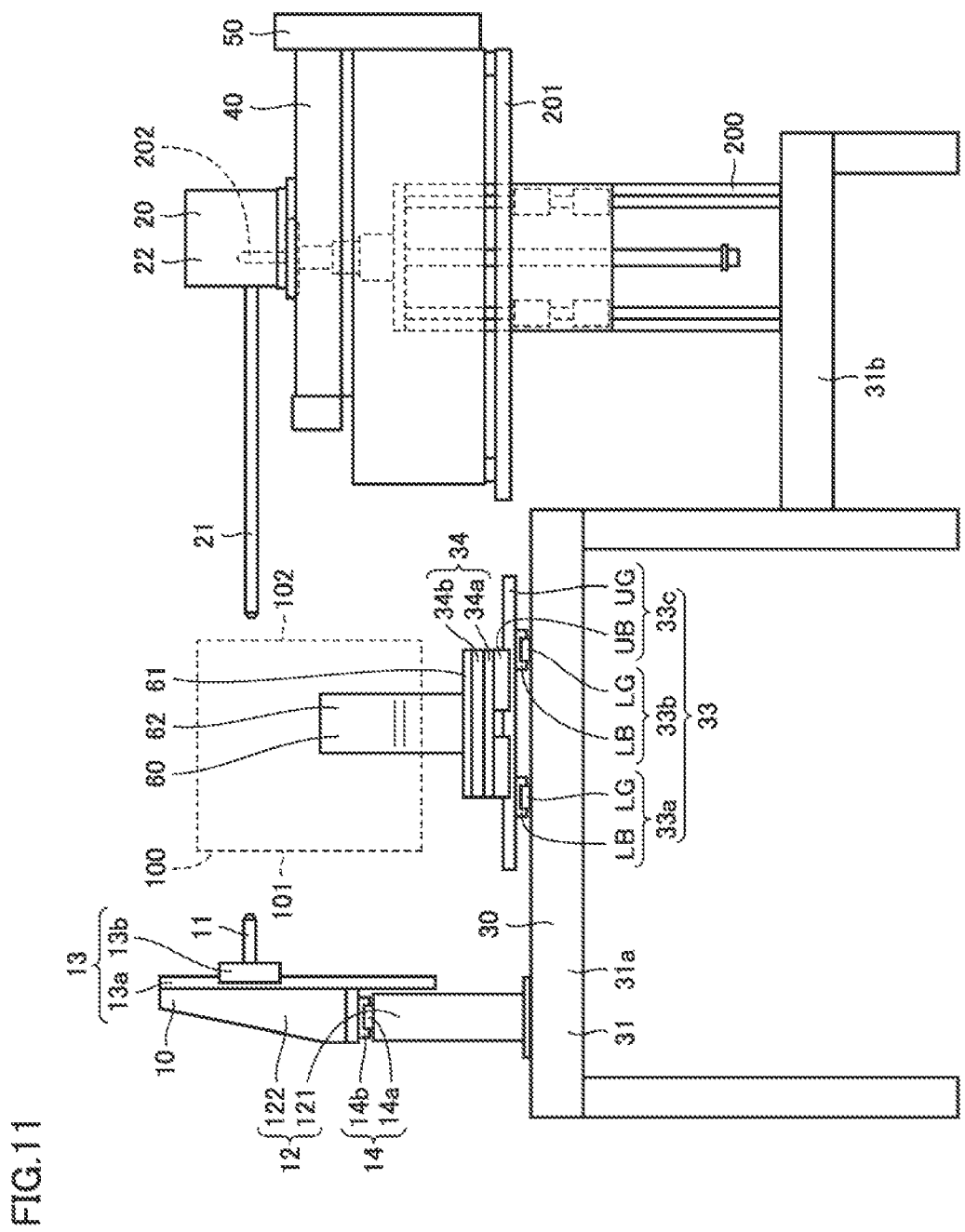
FIG. 11 is a side view schematically illustrating a configuration of another object hardness measuring device according to the embodiment.
Figure 12:
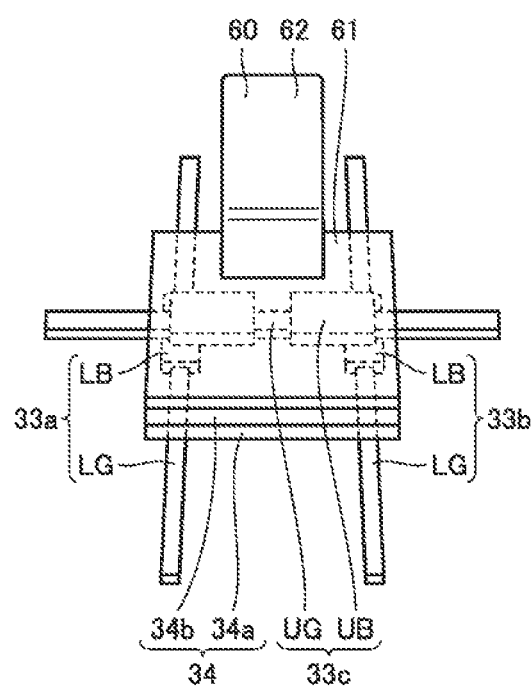
FIG. 12 is a perspective view schematically illustrating configurations of a slide unit, a rotation table, and the holding unit of another object hardness measuring device according to the embodiment.

With reference to FIGS. 11 and 12, a configuration of another hardness measuring device 1 for measuring hardness of measurement object 100 according to the embodiment will be described. In FIG. 11, for convenience of description. Measurement object 100 is schematically indicated by a broken line.

In another hardness measuring device 1 for measuring hardness of measurement object 100 according to the embodiment, first side portion 10 includes first protrusion 11, first side plate 12, a first slide member 13, and a second slide member 14. First protrusion 11 is attached to first side plate 12 via first slide member 13. First side plate 12 includes a fixing portion 121 and a movable portion 122. Fixing portion 121 is connected to movable portion 122 via second slide member 14.

First slide member 13 is, for example, a linear guide. First slide member 13 includes a first guide rail 13a and a first block 13b. First guide rail 13a extends in the vertical direction. First block 13b is movable in the vertical direction along first guide rail 13a.

First protrusion 11 is attached to first block 13b of first slide member 13. First protrusion 11 protrudes from first block 13b toward measurement object 100. First protrusion 11 is disposed on a side opposite of first block 13b with respect to first guide rail 13a. First protrusion 11 can move in the vertical direction by first block 13b moving in the vertical direction along first guide rail 13a.

Second slide member 14 is, for example, a linear guide. Second slide member 14 includes a second guide rail 14a and a second block 14b. Second guide rail 14a extends in the front-rear direction (direction perpendicular to the paper surface). Second block 14b is movable in the front-rear direction along second guide rail 14a.

Fixing portion 121 is fixed to the top surface of bottom plate 31 of pedestal unit 30. Movable portion 122 is movable with respect to the fixing portion 121 by second guide rail 14a. Second guide rail 14a is attached to an upper surface of fixing portion 121. Second block 14b is attached to a lower surface of movable portion 122. Movable portion 122 is movable in the front-rear direction by second block 14b moving in the front-rear direction along second guide rail 14a. First protrusion 11 can move in the front-rear direction by movable portion 122 moving in the front-rear direction. Therefore, first protrusion 11 can be moved in the vertical direction by first slide member 13, and can be moved in the front-rear direction by second slide member 14.

Pedestal unit 30 includes bottom plate 31 and a slide unit 33. Slide unit 33 is attached to the top surface of bottom plate 31. Bottom plate 31 includes a first bottom plate member 31a and a second bottom plate member 31b First bottom plate member 31a is disposed above second bottom plate member 31b. Fixing portion 121 of first side plate 12 and slide unit 33 are attached to a top surface of first bottom plate member 31a.

Slide unit 33 includes a first slide portion 33a, a second slide portion 33b, and a third slide portion 33c. First slide portion 33a and second slide portion 33b are disposed at intervals in the left-right direction.

First slide portion 33a, second slide portion 33b, and third slide portion 33c are, for example, linear guides. Each of first slide portion 33a and second slide portion 33b includes a lower guide rail LG and a lower block LB. Third slide portion 33c includes an upper guide rail UG and an upper block UB. Upper block UB is separated into two in the left-right direction along upper guide rail UG.

Lower guide rail LG of each of first slide portion 33a and second slide portion 33b extends in the front-rear direction. Lower block LB of each of first slide portion 33a and second slide portion 33b is movable in the front-rear direction along lower guide rail LG. Lower block LB of each of first slide portion 33a and second slide portion 33b is attached to upper guide rail UG of third slide portion 33c. Upper guide rail UG of third slide portion 33c extends in the left-right direction. Upper block UB of third slide portion 33c is movable in the left-right direction along upper guide rail UG.

Pedestal unit 30 further includes a rotation table 34. Rotation table 34 rotates along the top surface of bottom plate 31. Rotation table 34 includes a lower portion 34a and an upper portion 34b. Lower portion 34a and upper portion 34b rotate relative to each other. Rotation table 34 is disposed on slide unit 33. Lower portion 34a of rotation table 34 is attached to upper block UB of third slide portion 33c. Upper portion 34b of rotation table 34 is attached to holding unit 60. Rotation table 34 may freely rotate by 360° without specifying an angle. Further, rotation table 34 may rotate at a designated angle with an angular scale.

Holding unit 60 is connected onto slide unit 33 of pedestal unit 30. Holding unit 60 is able to hold measurement object 100. Holding unit 60 is movable by slide unit 33 between first side portion 10 and second side portion 20. Holding unit 60 can be moved in the left-right direction and the front-rear direction by slide unit 33. Holding unit 60 is connected onto slide unit 33 via rotation table 34. Holding unit 60 can be rotated in the in-plane direction of the top surface of bottom plate 31 by rotation table 34.

Second side portion 20 includes second protrusion 21 and second side plate 22. Second protrusion 21 is attached to second side plate 22. Second protrusion 21 protrudes from second side plate 22 toward measurement object 100. Second protrusion 21 protrudes toward first side portion 10 more than load unit 40 when symmetrical side surface (little finger side surface) 102 of measurement object 100 is pressed.

Second side plate 22 of second side portion 20 is connected to load unit 40. Load unit 40 moves second side portion 20 in the left-right direction. Load unit 40 applies a load to measurement object 100 by moving second side portion 20 with respect to first side portion 10 such that first side portion 10 presses one side surface (thumb-side outer surface) 101 and second side portion 20 presses symmetrical side surface (little-finger-side outer surface) 102. Second protrusion 21 can move in the left-right direction by load unit 40 moving second side portion 20 in the left-right direction.

Measuring unit 50 is able to measure, in a state where a load acts on measurement object 100, at least one of the movement distance of second side portion 20 with respect to first side portion 10, and the change amount of the load when second side portion 20 is moved either at a predetermined speed or to a predetermined position. Measuring unit 50 may include a monitor for displaying at least one of the movement distance of second side portion 20 with respect to first side portion 10, and the change amount of the load when second side portion 20 is moved either at a predetermined speed or to a predetermined position.

An existing compression testing machine may be used as second side portion 20, load unit 40, and measuring unit 50.

A lift stage 200 is attached to a top surface of second bottom plate member 31b. Lift stage 200 includes a table 201 and a handle 202. Table 201 is vertically movable by operating handle 202. An existing lifting unit may be used as lift stage 200. Second side portion 20, load unit 40, and measuring unit 50 are placed on table 201 of lift stage 200. When an existing compression testing machine is used as second side portion 20, load unit 40, and measuring unit 50, the existing compression testing machine may be placed on table 201 of lift stage 200. Second protrusion 21 can move in the vertical direction by lift stage 200 moving up and down in the vertical direction by operating handle 202. Therefore, second protrusion 21 can be moved in the left-right direction by load unit 40, and can be moved in the up-down direction by lift stage 200.

Next, another hardness measuring method for measuring hardness of measurement object 100 according to the embodiment will be described with reference to FIG. 11.

The another hardness measuring method for measuring hardness of measurement object 100 of the embodiment is a measurement method for measuring the hardness of measurement object 100.

The another hardness measuring method for measuring the hardness of measurement object 100 according to the embodiment includes the following steps.

Load unit 40 moves second side portion 20 with respect to first side portion 10 such that first side portion 10 is in contact with one side surface (thumb-side outer surface) 101 of measurement object 100 and second side portion 20 is in contact with symmetrical side surface (little-finger-side outer surface) 102 of measurement object 100. Measurement object 100 is held by holding unit 60 connected onto slide unit 33 attached to the top surface of bottom plate 31 of pedestal unit 30. Holding unit 60 is moved by slide unit 33 between first side portion 10 and second side portion 20. First protrusion 11 of first side portion 10 is in contact with one side surface (thumb-side outer surface) 101 of measurement object 100, and second protrusion 21 of second side portion 20 is in contact with symmetrical side surface (little-finger-side outer surface) 102 of measurement object 100.

A load acting on measurement object 100 by first side portion 10 and second side portion 20 when load unit 40 moves second side portion 20 with respect to first side portion 10 such that first side portion 10 presses one side surface (thumb-side outer surface) 101 and second side portion 20 presses the symmetrical side surface (little-finger-side outer surface) 102, and at least one of a movement distance of second side portion 20 with respect to first side portion 10 and a change amount of the load when second side portion 20 is moved either at a predetermined speed or to a predetermined position are measured by measuring unit 50.

First slide member 13 and second slide member 14 adjust the position of first protrusion 11 in the vertical direction and the front-rear direction. Slide unit 33 adjusts the position of measurement object 100 in the left-right direction and the front-rear direction.

Next, effects of another hardness measuring device 1 for measuring hardness of measurement object 100 and the hardness measuring method for measuring hardness of measurement object 100 according to the embodiment will be described.

According to another hardness measuring device 1 for measuring hardness of measurement object 100 of the embodiment, holding unit 60 is able to hold measurement object 100, and is movable between first side portion 10 and second side portion 20 by slide unit 33. As a result, first side portion 10 and second side portion 20 can be brought into contact with appropriate positions on measurement object 100 by slide unit 33.

According to another hardness measuring device 1 for measuring hardness of measurement object 100 of the embodiment, slide unit 33 adjusts the position of measurement object 100 in the left-right direction and the front-rear direction. As a result, measurement object 100 can be disposed at an appropriate position in the left-right direction and the front-rear direction.

According to another hardness measuring device 1 for measuring hardness of measurement object 100 of the embodiment, holding unit 60 is connected onto slide unit 33 via rotation table 34. As a result, the direction of measurement object 100 can be changed by the rotation of rotation table 34. Accordingly, first side portion 10 and second side portion 20 can be brought into contact with more appropriate positions on measurement object 100.

Figure 13:
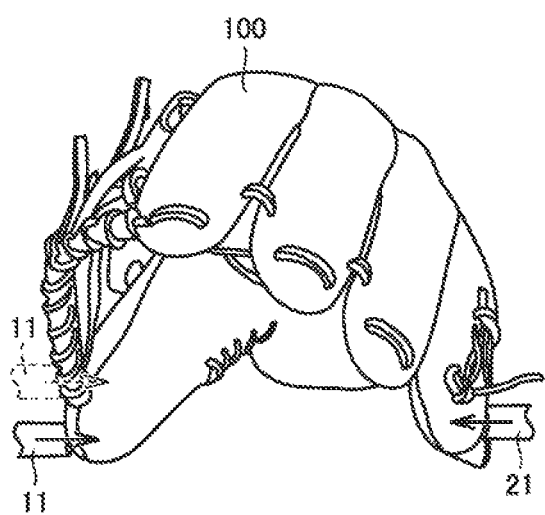
FIG. 13 is a top view illustrating a state in which a position of a first protrusion on a first side portion is adjusted with respect to a measurement object in another object hardness measuring device according to the embodiment.

Referring to FIGS. 11 and 13, in another hardness measuring device 1 for measuring hardness of measurement object 100 according to the embodiment, the position of first protrusion 11 can be adjusted in the vertical direction and the front-rear direction by first slide member 13 and second slide member 14. As a result, directions of the loads acting on measurement object 100 from first protrusion 11 and second protrusion 21 can be made coincident with each other.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An object hardness measuring device for measuring hardness of a measurement object, the measuring device comprising:
   a first side portion configured to press one side surface of the measurement object;
   a second side portion configured to press a second side surface of the measurement object, the second side surface being disposed at an opposite end with respect to the one side surface of the measurement object;
   a pedestal unit including a bottom plate and a slide rail assembly attached to a top surface of the bottom plate, the pedestal unit being movable on the second side portion with respect to the first side portion;
   a load unit configured to apply a load to the measurement obj ect by moving the second side portion with respect to the first side portion the pedestal unit such that the first side portion presses the one side surface and the second side portion presses the second side surface;
   a measuring unit configured to measure, in a state where the load acts on the measurement object, at least one of a movement distance of the second side portion with respect to the first side portion and a change amount of the load when the second side portion is moved either at a predetermined speed or to a predetermined position; and
   a holding unit connected onto the slide rail assembly of the pedestal unit, wherein the holding unit is configured to hold the measurement object, and is movable by the slide rail assembly between the first side portion and the second side portion.

2. The object hardness measuring device according to claim 1, wherein the first side portion includes a first protrusion, the first protrusion presses the one side surface of the measurement object, the second side portion includes a second protrusion, and the second protrusion presses the second side surface of the measurement object.

3. The object hardness measuring device according to claim 1, wherein the holding unit includes a base portion and a protrusion protruding from the base portion, and a moving direction of the holding unit is parallel to a moving direction of the second side portion.

4. The object hardness measuring device according to claim 2, wherein the first side portion includes a first side plate, the second side portion includes a second side plate, the first protrusion is attached to the first side plate in a positionally changeable manner, and the second protrusion is attached to the second side plate in a positionally changeable manner.

5. The object hardness measuring device according to claim 1, wherein the measurement object is a catching tool for baseball or softball.

6. An object hardness measuring method for measuring hardness of a measurement object, the measuring method comprising:
    moving a second side portion with respect to a first side portion by a pedestal unit including a bottom plate and a slide rail assembly attached to a top surface of the bottom plate such that the first side portion is in contact with one side surface of the measurement object and the second side portion is in contact with a second side surface of the measurement object, the second side surface being disposed at an opposite end with respect to the one side surface of the measurement object;
    holding the measurement object by a holding unit connected onto the slide rail assembly of the pedestal unit;
    moving the holding unit between the first side portion and the second side portion by the slide rail assembly; and
    measuring a load acting on the measurement object by the first side portion and the second side portion when the second side portion is moved with respect to the first side portion such that the first side portion presses the one side surface and the second side portion presses the second side surface, and at least one of a movement distance of the second side portion with respect to the first side portion and a change amount of the load when the second side portion is moved either at a predetermined speed or to a predetermined position.

7. An object hardness measuring device for measuring hardness of a measurement object, the measuring device comprising:
    a first side portion that presses one side surface of the measurement object;
    a second side portion that presses a second side surface of the measurement object, the second side surface being disposed at an opposite end with respect to the one side surface of the measurement object;
    a pedestal unit including a bottom plate and a slide assembly attached to a top surface of the bottom plate;
    a load unit that applies a load to the measurement object by moving the second side portion with respect to the first side portion such that the first side portion presses the one side surface and the second side portion presses the second side surface;
    a measuring unit that is able to measure, in a state where the load acts on the measurement object, at least one of a movement distance of the second side portion with respect to the first side portion and a change amount of the load when the second side portion is moved either at a predetermined speed or to a predetermined position; and a holding unit connected onto the slide assembly of the pedestal unit, wherein the holding unit is able to hold the measurement object, and is movable by the slide assembly between the first side portion and the second side portion.

8. The object hardness measuring device according to claim 7, wherein the pedestal unit includes a rotation table, the rotation table rotates along the top surface of the bottom plate, and the holding unit is connected onto the slide assembly via the rotation table.

* * * * *